(12) United States Patent
Suzuki et al.

(10) Patent No.: US 12,139,408 B2
(45) Date of Patent: Nov. 12, 2024

(54) SYNTHETIC GRAPHITE MATERIAL, SYNTHETIC GRAPHITE MATERIAL PRODUCTION METHOD, NEGATIVE ELECTRODE FOR LITHIUM ION SECONDARY BATTERY, AND LITHIUM ION SECONDARY BATTERY

(71) Applicant: ENEOS CORPORATION, Tokyo (JP)

(72) Inventors: Takashi Suzuki, Tokyo (JP); Takashi Maeda, Tokyo (JP); Mitsuo Karakane, Tokyo (JP); Takahiro Shirai, Tokyo (JP); Hiroshi Kawachi, Tokyo (JP); Noriyuki Kiuchi, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 573 days.

(21) Appl. No.: 17/422,668

(22) PCT Filed: Jan. 14, 2020

(86) PCT No.: PCT/JP2020/000825
§ 371 (c)(1),
(2) Date: Jul. 13, 2021

(87) PCT Pub. No.: WO2020/149251
PCT Pub. Date: Jul. 23, 2020

(65) Prior Publication Data
US 2022/0119264 A1 Apr. 21, 2022

(30) Foreign Application Priority Data

Jan. 15, 2019 (JP) ................................. 2019-004663

(51) Int. Cl.
*C01B 32/205* (2017.01)
*C01B 32/21* (2017.01)
(Continued)

(52) U.S. Cl.
CPC ............ *C01B 32/205* (2017.08); *C01B 32/21* (2017.08); *H01M 4/133* (2013.01);
(Continued)

(58) Field of Classification Search
CPC ...... C01B 32/205; C01B 32/21; H01M 4/133; H01M 4/1393
See application file for complete search history.

(56) References Cited

U.S. PATENT DOCUMENTS

2013/0273432 A1\* 10/2013 Ishimaru ............... C01B 32/205
423/448
2016/0319199 A1 11/2016 Kawachi et al.
2017/0057825 A1 3/2017 Suzuki et al.

FOREIGN PATENT DOCUMENTS

CN 104685680 A 6/2015
EP 2479823 A1 7/2012
(Continued)

OTHER PUBLICATIONS

Mar. 20, 2023 Office Action issued in Chinese Patent Application No. 202080009009.2.
(Continued)

*Primary Examiner* — Jonathan G Jelsma
(74) *Attorney, Agent, or Firm* — Oliff PLC

(57) ABSTRACT

Provided is a synthetic graphite material, in which a size L (112) of a crystallite in a c-axis direction as calculated from a (112) diffraction line obtained by an X-ray wide angle diffraction method is in a range of 4 to 30 nm, a surface area based on a volume as calculated by a laser diffraction type particle size distribution measuring device is in a range of 0.22 to 1.70 $m^2/cm^3$, an oil absorption is in a range of 67 to 147 mL/100 g, and a half width $\Delta v_G$ of a peak present in a wavelength range of 1580 $cm^{-1} \pm 100$ $cm^{-1}$ is in a range of 19
(Continued)

to 24 cm$^{-1}$ in Raman spectrum analysis using argon ion laser light having a wavelength of 514.5 nm.

2 Claims, 1 Drawing Sheet

(51) Int. Cl.
*H01M 4/133* (2010.01)
*H01M 4/1393* (2010.01)
*H01M 10/0525* (2010.01)

(52) U.S. Cl.
CPC ....... *H01M 4/1393* (2013.01); *C01P 2002/72* (2013.01); *C01P 2006/12* (2013.01); *H01M 10/0525* (2013.01)

(56) References Cited

FOREIGN PATENT DOCUMENTS

| EP | 2605318 | A1 | 6/2013 | |
|---|---|---|---|---|
| JP | 2007-153661 | A | 6/2007 | |
| JP | 2011-065961 | A | 3/2011 | |
| JP | 2012-216545 | A | 11/2012 | |
| JP | 5415684 | B2 | 2/2014 | |
| JP | 2015-110506 | A | 6/2015 | |
| JP | 2015-167118 | A | 9/2015 | |
| JP | 2016-91904 | A | 5/2016 | |
| JP | 2016-164862 | A | 9/2016 | |
| WO | 2012/020816 | A1 | 2/2012 | |
| WO | 2015/098754 | A1 | 7/2015 | |
| WO | WO-2018123371 | A1 * | 7/2018 | ........... C01B 32/205 |

OTHER PUBLICATIONS

Mar. 10, 2020 International Search Report issued in International Patent Application No. PCT/JP2020/000825.
Kingo Ariyoshi et al. "Twelve-Volt 'Lead-Free' Batteries: Mass Balance in a Cell To Extend Cycle Life". Abstracts of the 51st Battery Discussion Meeting 3G15, 2010.
Tomoki Tsumura et al. "Carbon Material for Negative Electrode for Lithium Ion Secondary Battery". Realize Corporation, 1996.
Akira Yoshida et al. "Full Width at Half Maximum Intensity of G Band in First Order Raman Spectrum of Carbon Material as a Parameter for Graphitization—A Study With Pyrolytic Carbons". TANSO, 2006, No. 221, pp. 2-7.
May 14, 2024 Office Action issued in Korean Patent Application No. 10-2021-7021893.

* cited by examiner

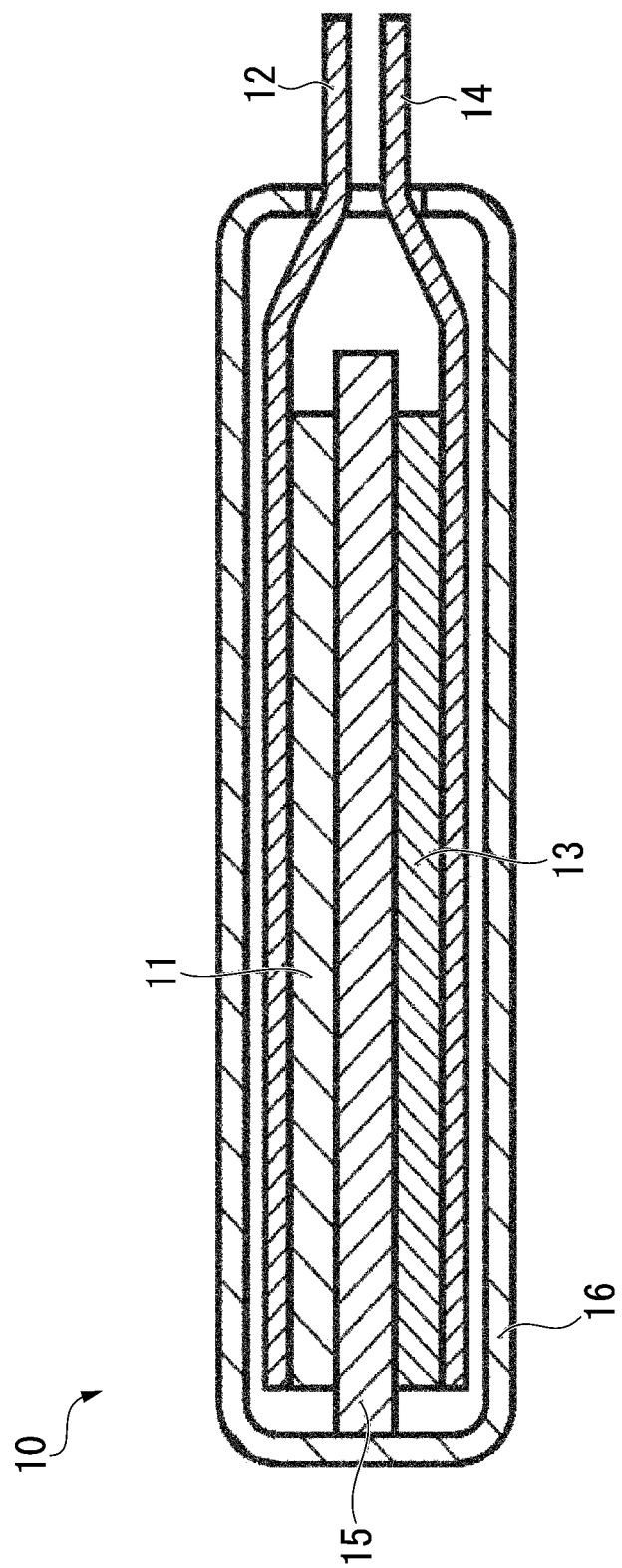

SYNTHETIC GRAPHITE MATERIAL, SYNTHETIC GRAPHITE MATERIAL PRODUCTION METHOD, NEGATIVE ELECTRODE FOR LITHIUM ION SECONDARY BATTERY, AND LITHIUM ION SECONDARY BATTERY

TECHNICAL FIELD

The present invention relates to a synthetic graphite material, a synthetic graphite material production method, a negative electrode for a lithium ion secondary battery, and a lithium ion secondary battery.

Priority is claimed on Japanese Patent Application No. 2019-004663, filed Jan. 15, 2019, the content of which is incorporated herein by reference.

BACKGROUND ART

Lithium ion secondary batteries are used for industrial purposes such as applications for automobiles and power storage of system infrastructures.

As a negative electrode material of a lithium ion secondary battery, graphite such as a synthetic graphite material has been used (see, for example, Patent Document 1).

Batteries used for applications for automobiles are used in a wide temperature range from a low temperature of 0° C. or lower to a high temperature of 60° C. or higher. However, a lithium ion secondary battery for which graphite is used as a negative electrode material has a disadvantage that lithium metal is likely to be deposited on the negative electrode at a low temperature of 0° C. or lower. In a case where lithium metal is deposited on the negative electrode, the amount of lithium ions that can move between the positive electrode and the negative electrode decreases. Therefore, the capacity of the lithium ion secondary battery is degraded.

It was previously reported that capacity degradation proceeds due to a difference in charge and discharge efficiency between a positive electrode and a negative electrode in a case where lithium metal is not deposited on the negative electrode (see, for example, Non Patent Document 1).

CITATION LIST

Patent Document

[Patent Document 1]
Japanese Patent No. 5415684

Non Patent Document

[Non Patent Document 1]
The 51st Battery Symposium in Japan 3G15 (Nov. 8, 2010)
[Non Patent Document 2]
"Carbon Material for Negative Electrode for Lithium Ion Secondary Batteries" pp. 3 to 4 (published by Realize Corporation, Oct. 20, 1996)
[Non Patent Document 3]
Carbon, 2006 (No. 221), pp. 2 to 7

SUMMARY OF INVENTION

Technical Problem

In lithium ion batteries obtained by using graphite as a negative electrode material, an object thereof is to suppress capacity degradation due to charging and discharging of the batteries at a low temperature of 0° C. or lower. In particular, industrial lithium ion batteries used for applications for automobiles and power storage of system infrastructures are problematic because these batteries are used in a wide temperature range.

The present invention has been made in consideration of the above-described circumstances, and an object thereof is to provide a synthetic graphite material which is used as a material of a negative electrode for a lithium ion secondary battery to obtain a lithium ion secondary battery whose discharge capacity hardly deteriorates even if charge and discharge are repeated at a low temperature of 0° C. or lower.

Further, an object of the present invention is to provide a production method of the synthetic graphite material, a negative electrode for a lithium ion secondary battery which contains the synthetic graphite material, and a lithium ion secondary battery which is formed of the negative electrode and has a discharge capacity that is unlikely to be degraded even in a case where charging and discharging are repeated at a low temperature of 0° C. or lower.

Solution to Problem

[1] A synthetic graphite material, in which a size L (112) of a crystallite in a c-axis direction as calculated from a (112) diffraction line obtained by an X-ray wide angle diffraction method is in a range of 4 to 30 nm, a surface area based on a volume as calculated by a laser diffraction type particle size distribution measuring device is in a range of 0.22 to 1.70 m$^2$/cm$^3$, an oil absorption is in a range of 67 to 147 mL/100 g, and a half width $\Delta v_G$ of a peak present in a wavelength range of 1580 cm$^{-1}$±100 cm$^{-1}$ is in a range of 19 to 24 cm$^{-1}$ in Raman spectrum analysis using argon ion laser light having a wavelength of 514.5 nm.

[2] A production method of the synthetic graphite material according to [1], including at least: a step of performing a coking treatment on a raw material oil composition by performing a delayed coking process to generate a coking coal composition; a step of pulverizing the coking coal composition to obtain coking coal powder; a step of performing a heat treatment on the coking coal powder to obtain graphite powder; and a step of pulverizing the graphite powder.

[3] The production method according to [2], in which the raw material oil composition contains at least gas oil having a final boiling point of 380° C. or lower and less than 1% by mass of an asphaltene component, and heavy oil having an initial boiling point of 200° C. or higher, 50% by mass or greater of an aroma component, 0.5% by mass or less of a sulfur content, and 0.2% by mass or less of a nitrogen content, and a content of the gas oil is in a range of 5% to 30% by mass.

[4] A negative electrode for a lithium ion secondary battery including: the synthetic graphite material according to [1].

[5] A lithium ion secondary battery including: the negative electrode according to [4].

Advantageous Effects of Invention

The lithium ion secondary battery which has a negative electrode containing the synthetic graphite material of the present invention has a discharge capacity that is unlikely to be degraded even in a case where charging and discharging are repeated at a low temperature of 0° C. or lower.

BRIEF DESCRIPTION OF DRAWINGS

FIG. 1 is a schematic cross-sectional view showing an example of a lithium ion secondary battery according to the present embodiment.

DESCRIPTION OF EMBODIMENTS

Hereinafter, a synthetic graphite material, a synthetic graphite material production method, a negative electrode for a lithium ion secondary battery, and a lithium ion secondary battery of the present invention will be described in detail. Further, the present invention is not limited to embodiments described below.

[Synthetic Graphite Material]

The synthetic graphite material of the present embodiment satisfies all the following conditions (1) to (4).

(1) A size L (112) of a crystallite in a c-axis direction as calculated from a (112) diffraction line obtained by an X-ray wide angle diffraction method is in a range of 4 to 30 nm.

(2) The surface area based on the volume as calculated by a laser diffraction type particle size distribution measuring device is in a range of 0.22 to 1.70 $m^2/cm^3$.

(3) The oil absorption is in a range of 67 to 147 mL/100 g.

(4) A half width $\Delta v_G$ of a peak present in a wavelength range of 1580 $cm^{-1}$±100 $cm^{-1}$ is in a range of 19 to 24 $cm^{-1}$ in Raman spectrum analysis using argon ion laser light having a wavelength of 514.5 nm.

The size L (112) of a crystallite in the c-axis direction as calculated from the (112) diffraction line obtained by the X-ray wide angle diffraction method under the above-described condition (1) is the size L (112) measured and calculated in conformity with the "method of measuring lattice constant and crystallite size of synthetic graphite material" of JIS R 7651 (2007). Hereinafter, the size L (112) measured and calculated by this method may also be simply referred to as the size L (112).

The surface area based on the volume as calculated by the laser diffraction type particle size distribution measuring device under the above-described condition (2) is the surface area based on the volume calculated in conformity with "5.5 Calculation of surface area based on volume" in "Representation of results of particle size analysis—Part 2: Calculation of average particle sizes/diameters of moments from particle size distributions" of JIS Z 8819-2 (2001). Hereinafter, the surface area based on the volume measured and calculated by this method may also be simply referred to as the "surface area based on the volume".

The oil absorption under the above-described condition (3) is the oil absorption measured and calculated in conformity with "Oil absorption—Section 1: Refined linseed oil method" of JIS K 5101-13-1 (2004). Hereinafter, the oil absorption measured and calculated as described above may also be simply referred to as the "oil absorption".

The half width $\Delta v_G$ under the above-described condition (4) is the half width of a peak present in a wavelength range of 1580 $cm^{-1}$±100 $cm^{-1}$ in Raman spectroscopy using argon ion ($Ar^+$) laser beam (excitation wavelength of 514.5 nm) as a laser source. Hereinafter, the half width $\Delta v_G$ described above may also be simply referred to as the "half width $\Delta v_G$".

As a result of intensive examination repeatedly conducted by the inventors by focusing on the size of a crystallite in the c-axis direction, the surface area based on the volume, the oil absorption, and the half width $\Delta v_G$ of the synthetic graphite material, it was found that degradation of the discharge capacity in a case where charging and discharging are repeated at a temperature of 0° C. or lower can be suppressed by employing a lithium ion secondary battery having a negative electrode that contains a synthetic graphite material satisfying all the above-described conditions (1) to (4), thereby completing the present invention.

The synthetic graphite material satisfying the condition (1) that "the size L (112) is in a range of 4 to 30 nm" has crystals which are highly developed. The synthetic graphite material having a size L (112) of 4 to 30 nm has a graphitization degree suitable for a negative electrode of a lithium ion secondary battery. Since the reversible capacity increases as the size L (112) increases, the size L (112) of the synthetic graphite material is preferably 4 nm or greater.

In the synthetic graphite material having a size L (112) of less than 4 nm, the crystal structure is insufficiently developed. Therefore, the lithium ion secondary battery having a negative electrode that contains a synthetic graphite material having a size L (112) of less than 4 nm is not preferable from the viewpoint that the capacity is a small capacity (see, for example, Non Patent Document 2).

The above-described condition (2) is a value obtained by expressing the particle diameter and the distribution of the synthetic graphite material as a numerical value. The synthetic graphite material used for a negative electrode of a lithium ion secondary battery is typically in the form of particles (powder). The particle diameter (particle size) of the synthetic graphite material has a distribution. The relationship between the particle diameter and the distribution (particle size distribution) of the synthetic graphite material is expressed as a histogram (surface). The value obtained by expressing the particle size distribution of the synthetic graphite material as a numerical value (point) is the surface area based on the volume.

The synthetic graphite material satisfying the condition (2) that the "surface area based on the volume is in a range of 0.22 to 1.70 $m^2/cm^3$" has a particle size distribution that enables the material to be used as a negative electrode material for a lithium ion secondary battery. In a case where the surface area based on the volume is less than 0.22 $m^2/cm^3$, the proportion of coarse powder particles having a large particle diameter increases, and thus a uniform negative electrode having a typical thickness (20 to 200 μm) may not be molded. Further, in a case where the surface area based on the volume is greater than 1.70 $m^2/cm^3$, the proportion of fine powder having a small particle diameter increases, and thus the influence of interaction such as adhesive force acting between particles may be stronger than the influence of the gravity. Therefore, in a case where a negative electrode of a lithium ion secondary battery is formed using a negative electrode mixture containing a synthetic graphite material, a homogeneous negative electrode mixture is unlikely to be obtained, which is not suitable for practical use.

The above-described condition (3) that the "oil absorption is in a range of 67 to 147 mL/100 g" is an index showing the number of particles per unit weight in a case where the surface area based on the volume of the above-described condition (2) is satisfied.

The particle size distribution is expressed as a histogram of the particle diameter (μm) and the frequency (%), but the frequency does not include any information related to the number of particles per unit weight. Similarly, the surface area based on the volume acquired from the particle size distribution does not include any information related to the number of particles per unit weight.

In a case where the oil absorption of the synthetic graphite material is 147 mL/100 g or less, the lithium ion secondary battery having a negative electrode containing the synthetic graphite material is formed such that lithium metal is unlikely to be deposited on the negative electrode even in a case where charge and discharge cycles are repeated at a low temperature of 0° C. or less and the discharge capacity is unlikely to be degraded. Further, in a case where the oil absorption of the synthetic graphite material is 67 mL/100 g or greater, since the number of particles per unit weight is large, charge acceptability can be sufficiently obtained even at a low temperature of 0° C. or lower. Therefore, the charge and discharge efficiency of the lithium secondary battery having a negative electrode containing the synthetic graphite material is remarkably improved. Therefore, the lithium ion secondary battery having a negative electrode that contains the synthetic graphite material having an oil absorption of 67 mL/100 g or greater is formed such that the capacity degradation due to repeated charge and discharge cycles at a temperature of 0° C. or lower is sufficiently suppressed in practical use.

On the contrary, in the lithium secondary battery having a negative electrode that contains the synthetic graphite material having an oil absorption of greater than 147 mL/100 g, in a case where the battery is charged and discharged at a low temperature of 0° C. or lower, the discharge capacity is rapidly degraded for each cycle due to deposition of lithium metal during charging of the battery at the negative electrode. More specifically, in the synthetic graphite material having an oil absorption of greater than 147 mL/100 g, peeling pulverizing occurs during the production preferentially than splitting pulverizing of graphite powder, and the graphite powder is pulverized while the particle shape is sliced, and thus the number of particles per unit weight increases. Therefore, in the negative electrode containing the synthetic graphite material, the void volume (a region where the electrolyte is present) between the adjacent particles of the synthetic graphite material is small, edges serving as entrances for lithium ions in the particles of the synthetic graphite material in which splitting pulverizing of graphite powder occurs are insufficient, and thus the ion conductivity of the electrolytic solution is insufficient. As a result, the cathodic polarization at the negative electrode due to charging of the battery at a low temperature of 0° C. or lower is likely to increase, lithium metal is likely to be deposited, and thus the discharge capacity is likely to be degraded.

In the present specification, the splitting pulverizing of graphite powder indicates pulverizing accompanied by breakage of chemical bonds of graphite, which is pulverizing in which cracks occur substantially perpendicular to the plane direction of graphite.

Further, the peeling pulverizing of graphite powder indicates pulverizing without breakage of chemical bonds of graphite, which is pulverizing in which peeling occurs substantially parallel to the plane direction of graphite.

In the lithium ion secondary battery having a negative electrode which contains the synthetic graphite material satisfying the above-described condition (4) that the "half width $\Delta v_G$ is in a range of 19 to 24 cm$^{-1}$", the discharge capacity is unlikely to be degraded even in a case where charge and discharge cycles are repeated at a low temperature of 0° C. or lower. The half width $\Delta v_G$ is an index showing the integrity (the regularity of the three-dimensional arrangement of carbon atoms) of local graphite crystals on a surface of a sample (a surface layer of each particle of the synthetic graphite material), and it is known that the half width decreases as the integrity increases (see, for example, Non Patent Document 3).

As shown below, the half width $\Delta v_G$ in the synthetic graphite material of the present embodiment can be regarded as an index indicating the ratio between the peeling pulverizing and the splitting pulverizing in the pulverizing of graphite powder during the production. The peeling pulverizing is pulverizing that occurs in a case where parallel shear stress is applied to a basal plane of a crystallite constituting graphite powder. Therefore, between a fracture surface on an edge side and a fracture surface on a basal plane side generated by pulverizing, the regularity of the three-dimensional arrangement of carbon atoms is greatly reduced especially in the fracture surface on the edge side, and the half width $\Delta v_G$ after pulverizing increases. Meanwhile, the splitting pulverizing is pulverizing that occurs in a case where vertical mechanical energy is applied to a basal plane of a crystallites constituting graphite powder. Therefore, the regularity of the three-dimensional arrangement of carbon atoms present in the fracture surface on the edge side is not reduced as compared with the case of the peeling pulverizing.

Accordingly, it can be considered that the probability of occurrence of the splitting pulverizing is higher than the probability of occurrence of the peeling pulverizing as the half width $\Delta v_G$ of the synthetic graphite material of the present embodiment decreases.

In a case where the half width $\Delta v_G$ of the synthetic graphite material is 19 cm$^{-1}$ or greater, the area of edges generated by the splitting pulverizing of graphite powder during the production is not extremely large in the specific surface area.

On the contrary, in the synthetic graphite material having a half width $\Delta v_G$ of less than 19 cm$^{-1}$, since the splitting pulverizing occurs preferentially than the peeling pulverizing of the graphite powder during the production, the ratio of the proportion of edges to the proportion of the basal plane of the graphite crystals in the specific surface area is extremely high. As a result, in the lithium ion battery having a negative electrode containing the synthetic graphite material, side reactions and competitive reactions are likely to occur at the negative electrode, and a rapid decrease in charge and discharge efficiency of the negative electrode is unavoidable. Therefore, a difference in charge and discharge efficiency between the negative electrode and the positive electrode is likely to increase, and the discharge capacity is likely to be degraded.

Further, in a case where the half width $\Delta v_G$ of the synthetic graphite material is 24 cm$^{-1}$ or less, in the lithium ion battery having a negative electrode containing the synthetic graphite material, the deposition of lithium metal on the negative electrode can be suppressed, and a decrease in charge and discharge efficiency of the negative electrode can be suppressed.

On the contrary, the synthetic graphite material having a half width $\Delta v_G$ of greater than 24 cm$^{-1}$ is formed such that the three-dimensional arrangement of carbon atoms in the edge surface of each particle surface of the synthetic graphite material is disturbed because the peeling pulverizing occurs preferentially than the splitting pulverizing of the graphite powder during the production. That is, the regularity of the three-dimensional arrangement of carbon atoms in the edge surface of each particle surface of the synthetic graphite material is reduced, and thus the integrity of the graphite crystals decreases. As a result, in the lithium ion battery having a negative electrode that contains the synthetic graphite material, the reversible intercalation reaction of lithium ions at the negative electrode is inhibited (steric hindrance occurs), and the resistance increases. Therefore, lithium metal is likely to be deposited on the negative electrode due to charging of the battery at a low temperature of 0° C. or lower, and thus the discharge capacity is likely to be degraded.

[Synthetic Graphite Material Production Method]

The synthetic graphite material of the present embodiment can be produced, for example, according to a production method described below.

That is, the production method includes a step of performing a coking treatment on a raw material oil composition by performing a delayed coking process to generate a coking coal composition; a step of pulverizing the coking coal composition to obtain coking coal powder; a step of performing a heat treatment on the coking coal powder to obtain graphite powder; and a step of pulverizing the graphite powder.

(Step of Performing Coking Treatment on Raw Material Oil Composition to Generate Coking Coal Composition)

As the raw material oil composition used in the synthetic graphite material production method of the present embodiment, those containing at least gas oil and heavy oil are preferable. Heavy oil generates a satisfactory bulk mesophase during the coking treatment. Since the compatibility of gas oil with heavy oil is satisfactory, gas oil is uniformly dispersed in the raw material oil composition. Further, gas oil generates gas in a case where the bulk mesophase generated during the coking treatment is polycondensed to be carbonized and solidified, and the size of the bulk mesophase is reduced.

"Heavy Oil"

As the heavy oil, it is preferable to use heavy oil having an initial boiling point of 200° C. or higher, 50% by mass or greater of an aroma component, 0.5% by mass or less of a sulfur content, and 0.2% by mass or less of a nitrogen content. The heavy oil may be used alone or in the form of a mixture of two or more kinds thereof.

As the gas oil, it is preferable to use gas oil having a final boiling point of 380° C. or lower and less than 1% by mass of an asphaltene component. The gas oil may be used alone or in the form of a mixture of two or more kinds thereof.

Further, the content of the gas oil in the raw material oil composition is preferably in a range of 5% to 30% by mass.

The initial boiling point of the heavy oil contained in the raw material oil composition is preferably 200° C. or higher and more preferably 250° C. or higher. The upper limit of the initial boiling point of the heavy oil is preferably 300° C. In a case where the initial boiling point of the heavy oil is 200° C. or higher, the yield of coke generated by the coking treatment sufficiently increases. The initial boiling point of the heavy oil is measured based on the method described in JIS K 2254-6: 1998.

The content of the aroma component in the heavy oil contained in the raw material oil composition is preferably 50% by mass or greater and more preferably 70% by mass or greater. The upper limit of the content of the aroma component is preferably 90% by mass. In a case where the content of the aroma component in the heavy oil is 50% by mass or greater, a satisfactory bulk mesophase is formed by the coking treatment and the progress of the coking reaction is promoted.

The aroma component in the heavy oil is measured by a TLC-FID method. In the TLC-FID method, a sample is divided into four components, which are a saturated component, an aroma component, a resin component, and an asphaltene component by thin layer chromatography (TLC), each component is detected by a flame ionization detector (FID), and the composition component value is obtained based on the percentage of the amount of each component with respect to the amount of all components.

First, 0.2 g±0.01 g of the sample is dissolved in 10 ml of toluene to prepare a sample solution. 1 µl of the sample solution is spotted on a lower end (at a 0.5 cm position of the rod holder) of a silica gel rod-like thin layer (chroma rod) that has been preheated using a microsyringe, and dried with a dryer or the like. Next, the sample is developed with a developing solvent using the 10 microrods as one set. As the developing solvent, hexane is used in a first developing tank, hexane/toluene (volume ratio of 20:80) is used in a second developing tank, and dichloromethane/methanol (volume ratio of 95:5) is used in a third developing tank.

The saturated component is eluted and developed in the first developing tank using hexane as the solvent. After the first development, the aroma component is eluted and developed in the second developing tank using hexane/toluene as the solvent. A chromatographic rod after the second development is set in a measuring instrument (for example, "IATROSCAN MK-5" (trade name), manufactured by Daitron Co., Ltd. (currently Mitsubishi Chemical Yatron)), and the amount of each component is measured. The amount of all components can be obtained by summing the amount of each component.

The sulfur content in the heavy oil contained in the raw material oil composition is preferably 0.5% by mass or less, more preferably 0.4% by mass or less, and still more preferably 0.3% by mass or less. The lower limit of the sulfur content is preferably 0.1% by mass. In a case where the sulfur content is 0.5% by mass or less, puffing of petroleum coke can be sufficiently suppressed. The sulfur content is measured in conformity with the method described in JIS M8813-Appendix 2: 2006.

The nitrogen content in the heavy oil contained in the raw material oil composition is preferably 0.2% by mass or less, more preferably 0.15% by mass or less, and still more preferably 0.10% by mass or less. The lower limit of the nitrogen content is preferably 0.01% by mass. In a case where the nitrogen content is 0.2% by mass or less, puffing of petroleum coke can be sufficiently suppressed. The nitrogen content is measured in conformity with the method described in JIS M 8813-Appendix 4: 2006.

The heavy oil contained in the raw material oil composition is obtained, for example, by fluid catalytic cracking. The heavy oil is not particularly limited as long as the initial boiling point, the aroma component, the sulfur content, and the nitrogen content satisfy the above-described conditions. As the heavy oil, for example, hydrocarbon oil having a density of 0.8 g/cm$^3$ or greater at 15° C. can be used. Further, the density is a value measured in conformity with the method described in JIS K 2249-1: 2011.

Examples of the raw material oil for the heavy oil contained in the raw material oil composition include atmospheric residual oil, vacuum residual oil (VR), shale oil, tar sands bitumen, orinoco tar, coal-liquefied oil, and hydrotreated heavy oil. Such raw material oil may contain gas oil such as straight-run gas oil, vacuum gas oil, desulfurized gas oil, or desulfurized vacuum gas oil, and it is preferable that the raw material oil contains vacuum gas oil. It is preferable that the vacuum gas oil is desulfurized vacuum gas oil (preferably having a sulfur content is 500 mass ppm or less and a density of 0.8/cm$^3$ or greater at 15° C.) obtained by directly desulfurizing vacuum gas oil obtained by performing vacuum distillation on the atmospheric residual oil.

The atmospheric residual oil is a fraction obtained in a case where crude oil is fed to an atmospheric distillation unit and heated under the atmospheric pressure so as to be divided into gas/LPG (liquefied petroleum gas), a gasoline fraction, a kerosene fraction, a gas oil fraction, and atmospheric residual oil based on the boiling points of the fractions, and the atmospheric residual oil is a fraction having the highest boiling point. The heating temperature varies depending on the production area of crude oil and the like and is not limited as long as the oil can be fractionated into these fractions, and for example, crude oil is heated at 320° C.

The vacuum residual oil (VR) is bottom oil of a vacuum distillation unit obtained by feeding crude oil to an atmospheric distillation unit to obtain gas, gas oil, and atmospheric residual oil and then the atmospheric residual oil changing in a heating furnace outlet temperature range of 320° C. to 360° C. under reduced pressure of 1.3 to 4.0 kPa (10 to 30 Torr).

The conditions for fluid catalytic cracking are not particularly limited as long as heavy oil in which the initial boiling point, the aroma component, the sulfur content, and the nitrogen content satisfy the above-described conditions can be obtained. Specifically, for example, conditions set such that the reaction temperature is in a range of 480° C. to 560° C., the total pressure is in a range of 0.1 to 0.3 MPa, the ratio of the catalyst to the oil (catalyst/oil) is in a range of 1 to 20, and the contact time is in a range of 1 to 10 seconds. Examples of the catalyst used for fluid catalytic cracking include a zeolite catalyst, a silica-alumina catalyst, and a catalyst in which a noble metal such as platinum is carried by these catalysts.

"Gas Oil"

It is preferable that the gas oil contained in the raw material oil composition is gas oil having a high aromatic content. Representative examples of the gas oil having a high aromatic content include coker gas oil. Gas oil having high aromaticity has excellent compatibility with heavy oil. The gas oil having excellent compatibility with heavy oil is uniformly dispersed in the raw material oil composition. Therefore, gas is uniformly generated from the gas oil in the raw material oil composition during the coking treatment, the needle-like property of coke is likely to be developed, and thus a coking coal composition having a fine structure with a selective orientation, which is formed of a crystallite in which small hexagonal network planes are laminated, is likely to be obtained. As a result, the coefficient of thermal expansion (CTE) of coke decreases, which is preferable.

The process used to obtain the gas oil contained in the raw material oil composition is not particularly limited. Examples thereof include a delayed coking process, a visbreaking process, a Eureka process, a heavy oil cracking (HSC) process, and a fluid catalytic cracking process.

The operating conditions are not particularly limited, but it is preferable that the treatment is performed in a cracking temperature range of 400° C. to 600° C. at a reaction pressure of 0.8 MPa using the heavy oil as a raw material with a coker thermal cracking device.

The final boiling point of the gas oil contained in the raw material oil composition is preferably 380° C. or lower and more preferably 350° C. or lower. The lower limit of the final boiling point of the gas oil is preferably 310° C. In a case where the final boiling point of the gas oil is 380° C. or lower, since the amount of fractions that are coked by the coking treatment is small, the coefficient of thermal expansion (CTE) of coke decreases. The final boiling point of the gas oil is measured in conformity with the method described in JIS K 2254-4: 1998.

The content of the asphaltene component in the gas oil contained in the raw material oil composition is preferably less than 1% by mass and more preferably 0% by mass (not detected by analysis). Further, in a case where the final boiling point of the gas oil is 380° C. or lower, the composition does not substantially contain any coking components. It is preferable that the amount of coking components contained in the gas oil is small from the viewpoint that CTE and puffing of coke are not adversely affected and can be sufficiently suppressed.

From the viewpoint of the compatibility with the heavy oil, the content of the aroma component in the gas oil contained in the raw material oil composition is preferably 40% by volume or greater and more preferably 50% by volume or greater. The upper limit of the content of the aroma component in the gas oil is preferably 70% by volume. Further, the aroma component here is measured based on the volume percentage (% by volume) of the total aromatic content with respect to the total amount of coker gas oil measured in conformity with Petroleum Institute Method JPI-5S-49-97 "Hydrocarbon Type Test Method-High Performance Liquid Chromatograph Method", published by The Japan Petroleum Institute.

In the gas oil contained in the raw material oil composition, the content of the aroma component having two or more aromatic rings is more preferably 20% by volume or greater and still more preferably 45% by volume or greater. Gas oil containing an aroma component having two polycyclic aromatic rings is preferable from the viewpoint of excellent compatibility with the heavy oil.

The aroma component and the asphaltene component of the gas oil are measured according to the same method as that for the aroma component of the heavy oil.

The raw material oil for the gas oil contained in the raw material oil composition is not particularly limited as long as the gas oil in which the final boiling point and the asphaltene component satisfy the above-described conditions can be obtained. As the raw material oil for the gas oil, raw material oil having a density of 0.8 g/cm$^3$ or greater at 15° C. is preferably used.

The fluid catalytic cracking for obtaining gas oil is typically performed under the same conditions as those for the fluid catalytic cracking for obtaining heavy oil described above.

The temperature in the delayed coking process for obtaining gas oil is preferably in a range of 400° C. to 600° C. In a case where the temperature thereof is 400° C. or higher, the coking treatment for obtaining gas oil proceeds. Further, in a case where the temperature thereof is 600° C. or lower, the reaction in the coking treatment can be allowed to proceed gently.

The pressure in the delayed coking process for obtaining gas oil is preferably in a range of 300 to 800 kPa. It is preferable that the pressure thereof is in the above-described range from the viewpoint that the yield of coke increases as the pressure increases. The pressure thereof can be determined as appropriate by the process.

The raw material oil composition used for the synthetic graphite material production method according to the present embodiment contains at least the gas oil and the heavy oil described above, and the content of the gas oil in the raw material oil composition is preferably in a range of 5% to 30% by mass. A coking coal composition having a fine structure with a selective orientation, which is formed of a crystallite in which small hexagonal network planes are laminated, is obtained by performing the coking treatment on such a raw material oil composition by performing a delayed coking process. The content of the gas oil in the raw material oil composition is more preferably in a range of 10% to 30% by mass.

On the contrary, in a case where the content of the gas oil in the raw material oil composition is less than 5% by mass, the amount of gas to be generated from the gas oil during the coking treatment decreases. Therefore, it is difficult to form a fine structure with a selective orientation, which is formed of a crystallite in which small hexagonal network planes are laminated, by performing the coking treatment.

Further, in a case where the content of the gas oil in the raw material oil composition is greater than 30% by mass, since the amount of gas to be generated from the gas oil during the coking treatment is extremely large, refinement of the carbon hexagonal network planes constituting the mesophase generated by the coking treatment extremely proceeds. As a result, in the pulverizing of the graphite powder during production, splitting pulverizing occurs preferentially than peeling pulverizing, and thus the proportion of the area of edges generated by the splitting pulverizing in the specific surface area of the synthetic graphite material increases more than necessary. The lithium ion battery having a negative electrode containing such a synthetic graphite material is formed such that the charge and discharge efficiency of the negative electrode is likely to decrease, and the discharge capacity is degraded significantly due to repeated charging and discharging of the battery at a low temperature of 0° C. or lower.

Further, in a case where the content of the gas oil in the raw material oil composition is greater than 30% by mass, the coke yield of the raw material oil obtained by the coking treatment may decrease significantly, and the amount of coke to be produced may be insufficient.

As a method of performing "the coking treatment on the raw material oil composition by performing a delayed coking process" in the synthetic graphite material production method of the present embodiment, for example, a known method described in Patent Document 1 can be used.

The method of performing the coking treatment on the raw material oil composition by performing a delayed coking process is markedly suitable for mass production of raw materials for high-quality synthetic graphite materials.

In the present embodiment, a delayed coking process is used as the method of performing the coking treatment on the raw material oil composition.

As the coking treatment, for example, it is preferable to use a treatment of thermally cracking and polycondensing the raw material oil composition using delayed coke under the condition that the coking pressure is controlled to obtain a coking coal composition containing raw coke.

The pressure in the coking treatment is preferably in a range of 100 to 800 kPa and more preferably in a range of 100 to 600 kPa. In a case where the pressure in the coking treatment is in a range of 100 to 800 kPa, a coking coal composition having a fine structure with a selective orientation, which is formed of a crystallite in which small hexagonal network planes are laminated is likely to be obtained by performing the coking treatment.

The temperature in the coking treatment is preferably in a range of 400° C. to 600° C. and more preferably in a range of 490° C. to 540° C. In a case where the temperature in the coking treatment is in a range of 400° C. to 600° C., a satisfactory mesophase can be grown from the raw material oil composition.

(Step of Obtaining Coking Coal Powder)

Next, a step of pulverizing the coking coal composition generated by the coking treatment to obtain coking coal powder is performed. The method of pulverizing the coking coal composition to obtain coking coal powder is not particularly limited, and a known method such as a method using a hammer type mill can be used.

The coking coal powder may be classified so as to have a predetermined particle size. The particle size of the coking coal powder is preferably in a range of 5 to 40 μm in terms of the average particle diameter. The average particle diameter is obtained based on the measurement using a laser diffraction type particle size distribution meter. In a case where the average particle diameter of the pulverized coking coal powder is 40 μm or less, the coking coal powder will have a particle diameter suitable for a negative electrode of a lithium ion secondary battery by being subjected to a heat treatment and being pulverized. It is preferable that the average particle diameter of the coking coal powder is 5 μm or greater from the viewpoint that the specific surface area of the graphite material obtained by performing a heat treatment on the coking coal powder does not extremely increase. In a case where a paste-like negative electrode mixture used for forming a negative electrode of a lithium ion secondary battery using a graphite material having an excessively large specific surface area is prepared, the amount of the solvent to be required is extremely large, which is not preferable.

(Step of Performing Heat Treatment on Coking Coal Powder to Obtain Graphite Powder)

Next, a step of performing a heat treatment on the coking coal powder to obtain graphite powder is performed.

The heat treatment of the coking coal powder in the synthetic graphite material production method of the present embodiment is performed in order to remove volatile components from the coking coal powder, and dehydrate and thermally crack the coking coal powder to cause a solid phase graphitization reaction. By performing the heat treatment, a synthetic graphite material with a stable quality can be obtained.

As the heat treatment of the coking coal powder, a heat treatment of removing volatile components from the coking coal powder or carrying out calcination to obtain calcined coke, performing a carbonization treatment for carbonizing the coking coal powder, and performing a graphitization treatment is an exemplary example. The calcination and the carbonization treatment can be performed as necessary and may not be performed. Even if the calcination and the carbonization step are eliminated in the heat treatment for the coking coal powder, there is almost no impact on the physical properties of the synthetic graphite material to be finally produced.

As the calcination, a method of performing a heat treatment at a highest reach temperature of 500° C. to 1500° C. and preferably 900° C. to 1200° C. for a highest reach temperature holding time of 0 to 10 hours in an atmosphere of inert gas such as nitrogen, argon, or helium is an exemplary example. For example, a rotary kiln, a shaft furnace, or the like can be used for the calcination.

As the carbonization treatment, a method of performing a heat treatment at a highest reach temperature of 500° C. to 1500° C. and preferably 900° C. to 1500° C. for a highest reach temperature holding time of 0 to 10 hours in an atmosphere of inert gas such as nitrogen, argon, or helium is an exemplary example.

As the graphitization treatment, a method of performing a heat treatment at a highest reach temperature of 2500° C.

to 3200° C. and preferably 2800° C. to 3200° C. for a highest reach temperature holding time of 0 to 100 hours in an atmosphere of inert gas such as nitrogen, argon, or helium is an exemplary example. The graphitization treatment may be performed, for example, by enclosing the coking coal powder in a crucible made of graphite using a graphitization furnace such as an Acheson furnace or an LWG furnace.

In the synthetic graphite material production method of the present embodiment, in a case where a coking coal composition having a fine structure with a selective orientation, which is formed of a crystallite in which small hexagonal network planes are laminated, is used as the coking coal composition, the crystal structure is likely to be developed by performing a heat treatment on the coking coal powder obtained by pulverizing the coking coal composition. As a result, a synthetic graphite material satisfying the above-described condition (1) that "the size L (112) is in a range of 4 to 30 nm" can be easily obtained, which is preferable.

(Step of Pulverizing Graphite Powder)

In the synthetic graphite material production method of the present embodiment, the method of pulverizing graphite powder obtained by performing a heat treatment on the coking coal powder is not particularly limited, and a known method such as a method using an air flow jet mill can be used.

By performing the above-described steps, the synthetic graphite material of the present embodiment is obtained.

In the synthetic graphite material production method of the present embodiment, in the case where a coking coal composition having a fine structure with a selective orientation, which is formed of a crystallite in which small hexagonal network planes are laminated, is used as the coking coal composition, splitting pulverizing is likely to occur in a case where the graphite powder is pulverized obtained by performing a heat treatment on the coking coal powder. The reason for this is because the probability that the graphite powder obtained by using the coking coal composition having the above-described fine structure is broken between adjacent hexagonal network planes having a small size before the heat treatment in a case where mechanical energy for pulverizing is applied to the graphite powder is high.

In a case where the graphite powder obtained by performing a heat treatment on the coking coal powder obtained by pulverizing the coking coal composition satisfies the above-described condition (1) that "the size L (112) is in a range of 4 to 30 nm" and the splitting pulverizing occurs preferentially than the peeling pulverizing, the oil absorption and the half width $\Delta v_G$ are set to be sufficiently small by performing the step of pulverizing the graphite powder, and the thus the synthetic graphite material of the present embodiment which satisfies the above-described conditions (3) and (4) can be easily obtained.

On the contrary, in a case where the graphite powder obtained by performing a heat treatment on the powder of the coking coal composition formed of a crystallite in which large hexagonal network planes are laminated satisfies the above-described condition (1) that "the size L (112) is in a range of 4 to 30 nm", the peeling pulverizing occurs preferentially than the splitting pulverizing in a case where the graphite powder is pulverized.

Therefore, the oil absorption and the half width $\Delta v_G$ increase rapidly in a case where the step of pulverizing the graphite powder is performed, and thus the synthetic graphite material of the present embodiment which satisfies the above-described conditions (3) and (4) cannot be obtained.

In the synthetic graphite material production method of the present embodiment, it is preferable that the synthetic graphite material of the present embodiment which satisfies the above-described conditions (3) and (4) is produced by a method of controlling the following items (a) and (b).

(a) The properties (the final boiling point and the content of asphaltene component) and the proportion (the content in the raw material oil composition) of the gas oil in the raw material oil composition are controlled.

(b) A difference between the surface area based on the volume after the pulverizing of the coking coal composition (hereinafter, also referred to as the "surface area based on the volume of the raw material") and the surface area based on the volume after the pulverizing of the graphite powder which has been subjected to a heat treatment (hereinafter, also referred to as the "surface area based on the volume of the graphite") is controlled.

The surface area based on the volume of the graphite in the item (b) described above is the surface area based on the volume in the condition (2) for the synthetic graphite material of the present embodiment. Therefore, the surface area based on the volume of the graphite in the item (b) described above is in a range of 0.22 to 1.70 m²/cm³. Further, the surface area based on the volume of the raw material in the item (b) described above is a value larger than the surface area based on the volume of the graphite.

It is preferable that the surface area based on the volume of the raw material in the item (b) described above is appropriately adjusted such that the difference between the surface area based on the volume of the raw material and the surface area based on the volume of the graphite is set to be in a range of 0.05 to 1.40 m²/cm³ and the synthetic graphite material satisfying the above-described condition (3) that "the oil absorption is in a range of 67 to 147 mL/100 g" and the above-described condition (4) that "the half width $\Delta v_G$ is in a range of 19 to 24 cm⁻¹" can be obtained. The difference between the surface area based on the volume of the raw material and the surface area based on the volume of the graphite can be controlled by controlling the pulverizing conditions (such as operating conditions of a pulverizer) in a case of pulverizing the coking coal composition and pulverizing the graphite powder which has been subjected to the heat treatment.

The half width $\Delta v_G$ increases monotonically as the oil absorption increases. Further, the function of the oil absorption with respect to the half width $\Delta v_G$ strongly depends on the properties (the final boiling point and the content of the asphaltene component) and the proportion (the content in the raw material oil composition) of the gas oil of the raw material oil composition. Therefore, the oil absorption and the half width $\Delta v_G$ of the synthetic graphite material can be controlled to satisfy the above-described conditions (3) and (4) within the range of the surface area based on the volume of the condition (2) by changing the items (a) and (b) described above. For example, even in a case where the graphite powder is pulverized so as to satisfy the above-described condition (3), the synthetic graphite material in which the half width $\Delta v_G$ is small (that is, the probability of occurrence of the splitting pulverizing is higher than the probability of occurrence of the peeling pulverizing) and the above-described condition (4) is satisfied can be produced.

In the lithium ion secondary battery having a negative electrode containing the synthetic graphite material of the present embodiment, the discharge capacity is unlikely to be degraded even in a case where charging and discharging of the battery are repeated at a low temperature of 0° C. or lower. This effect is obtained because the synthetic graphite material of the present embodiment has a small oil absorption and a small half width $\Delta v_G$ and satisfies all the above-described conditions (1) to (4).

In the lithium ion secondary battery having a negative electrode containing the synthetic graphite material of the present embodiment, since the discharge capacity is unlikely to be degraded even in the case where charging and discharging of the battery are repeated at a low temperature of 0° C. or lower, the battery is suitable for industrial purposes such as applications for automobiles such as hybrid automobiles, plug-in hybrid automobiles, and electric automobiles and power storage of system infrastructures.

[Negative Electrode for Lithium Ion Secondary Battery]

Next, a negative electrode for the lithium ion secondary battery of the present embodiment will be described.

The negative electrode for the lithium ion secondary battery of the present embodiment contains the graphite material containing the synthetic graphite material of the present embodiment, a binder (binding agent), and a conductive assistant contained as necessary.

The negative electrode for the lithium ion secondary battery of the present embodiment is not limited as long as the negative electrode contains the synthetic graphite material of the present embodiment, and the negative electrode may further contain, as the graphite material, one or two or more kinds of known graphite materials as necessary in addition to the synthetic graphite material of the present embodiment.

Examples of known graphite materials include synthetic graphite materials other than the synthetic graphite material of the present embodiment and natural graphite-based materials.

Examples of the natural graphite-based materials include naturally produced graphite-like materials, materials obtained by highly purifying the graphite-like materials, highly purified and then spherically formed (including a mechanochemical treatment) materials, and materials obtained by coating surfaces of high-purity products and spherical products with other carbons (for example, pitch-coated products and CVD-coated products), and materials which have been subjected to a plasma treatment.

The shapes of the synthetic graphite materials other than the synthetic graphite material of the present embodiment, and the natural graphite-based materials are not particularly limited, and may be, for example, scaly or spherical.

In a case where the negative electrode contains a graphite material (another graphite material) other than the synthetic graphite material of the present embodiment, the mixing ratio between the synthetic graphite material of the present embodiment and the other graphite material can be set to be optional. In the case where the negative electrode contains a graphite material (another graphite material) other than the synthetic graphite material of the present embodiment, the content of the synthetic graphite material of the present embodiment is preferably 20% by mass or greater, preferably 30% by mass or greater, and still more preferably 50% by mass or greater.

As the binder (binding agent), a known agent used for a negative electrode for a lithium ion secondary battery can be used, and for example, carboxymethyl cellulose (CMC), polyvinylidene fluoride, polytetrafluoroethylene, and styrene-butadiene rubber (SBR) can be used alone or in the form of a mixture of two or more kinds thereof.

The content of the binder in the negative electrode mixture is preferably approximately 1 to 30 parts by mass with respect to 100 parts by mass of the graphite material, and may be appropriately set as necessary in consideration of the design of the lithium ion secondary battery.

As the conductive assistant, a known agent used for a negative electrode for a lithium ion secondary battery can be used, and for example, conductive polymers such as carbon black, graphite, acetylene black, an indium-tin oxide exhibiting conductivity, polyaniline, polythiophene, and polyphenylene vinylene can be used alone or in the form of a mixture of two or more kinds thereof.

The amount of the conductive assistant to be used is preferably in a range of 1 to 15 parts by mass with respect to 100 parts by mass of the graphite material, and may be appropriately set as necessary in consideration of the design of the lithium ion secondary battery.

The method of producing the negative electrode for the lithium ion secondary battery of the present embodiment is not particularly limited, and a known production method can be used.

For example, a negative electrode mixture which is a mixture containing the graphite material that contains the synthetic graphite material of the present embodiment, a binder (binding agent), a conductive assistant contained as necessary, and a solvent is produced. Thereafter, a method of pressure-molding the negative electrode mixture to predetermined dimensions is performed.

As the solvent used in the negative electrode mixture, a known solvent used for the negative electrode for a lithium ion secondary battery can be used. Specifically, for example, an organic solvent such as dimethylformamide, N-methylpyrrolidone, isopropanol, or toluene, and a solvent such as water can be used alone or in the form of a mixture of two or more kinds thereof.

In the production of the negative electrode mixture, as a method of mixing the graphite material, the binder, the conductive assistant contained as necessary, and the organic solvent, for example, a known device such as a screw type kneader, a ribbon mixer, a universal mixer, or a planetary mixer can be used.

The pressure molding of the negative electrode mixture can be performed by using a method such as roll pressure or press pressure. It is preferable that the pressure molding of the negative electrode mixture is performed at a pressure of approximately 100 to 300 MPa.

The negative electrode for a lithium ion secondary battery of the present embodiment may be produced by, for example, a method described below. That is, the graphite material containing the synthetic graphite material of the present embodiment, the binder (binding agent), the conductive assistant contained as necessary, and the solvent are kneaded by a known method to produce a slurry-like (paste-like) negative electrode mixture. Thereafter, a negative electrode current collector such as copper foil is coated with the slurry-like negative electrode mixture and dried to mold into a sheet-like or pellet-like shape. Thereafter, the layer formed of the dried negative electrode mixture is rolled and cut to have predetermined dimensions.

The method of coating the negative electrode current collector with the slurry-like negative electrode mixture is not particularly limited, and for example, a known method such as a metal mask printing method, an electrostatic coating method, a dip coating method, a spray coating method, a roll coating method, a doctor blade method, a gravure coating method, a screen printing method, or a die coater method can be used.

It is preferable that the negative electrode mixture applied onto the negative electrode current collector is rolled using, for example, a flat press, a calendar roll, or the like.

The layer formed of the dried negative electrode mixture formed on the negative electrode current collector can be integrated with the negative electrode current collector according to a known method such as a method using a roll, a press, or a combination thereof.

The material of the negative electrode current collector can be used without any limitation if the material does not form an alloy with lithium. Specific examples of the material of the negative electrode current collector include copper, nickel, titanium, and stainless steel.

The shape of the negative electrode current collector can also be used without any limitation. Specific examples of the shape of the negative electrode current collector include a foil shape, a perforated foil shape, a mesh shape, and a strip shape as the overall shape thereof.

Further, as the negative electrode current collector, for example, a porous material such as a porous metal (foam metal) or carbon paper may be used.

[Lithium Ion Secondary Battery]

Next, the lithium ion secondary battery of the present embodiment will be described.

FIG. 1 is a schematic cross-sectional view showing an example of the lithium ion secondary battery of the present embodiment. A lithium ion secondary battery 10 shown in FIG. 1 includes a negative electrode 11 integrated with a negative electrode current collector 12 and a positive electrode 13 integrated with a positive electrode current collector 14. In the lithium ion secondary battery 10 shown in FIG. 1, the negative electrode of the present embodiment is used as the negative electrode 11. The negative electrode 11 and a positive electrode 13 are disposed to face each other with a separator 15 interposed therebetween. In FIG. 1, the reference numeral 16 represents an aluminum laminate exterior. An electrolytic solution is injected into the aluminum laminate exterior 16.

The positive electrode 10 contains an active material, a binder (binding agent), and a conductive assistant contained as necessary.

As the active material, a known material used for a positive electrode for a lithium ion secondary battery can be used, and a metal compound, a metal oxide, a metal sulfide, or a conductive polymer material which is capable of doping or intercalating lithium ions can be used. Specific examples of the active material include lithium cobaltate ($LiCoO_2$), lithium nickelate ($LiNiO_2$), lithium manganate ($LiMn_2O_4$), a complex oxide ($LiCo_xNi_yMn_zO_2$, X+Y+Z=1), a lithium vanadium compound, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine type $LiMPO_4$ (M:Co, Ni, Mn, Fe), a conductive polymer such as polyacetylene, polyaniline, polypyrrole, polythiophene, or polyacene, porous carbon, and mixtures thereof.

As the binder, the same binder as that used for the negative electrode 11 described above can be used.

As the conductive assistant, the same conductive assistant as that used for the negative electrode 11 described above can be used.

As the positive electrode current collector 14, the same negative electrode current collector as described above can be used.

As the separator 15, for example, non-woven fabric, a cloth, a microporous film, which contains polyolefin such as polyethylene or polypropylene as a main component, or a combination thereof can be used.

Further, in a case where the lithium ion secondary battery has a structure in which the positive electrode and the negative electrode do not come into direct contact with each other, the separator is unnecessary.

As the electrolytic solution and an electrolyte used in the lithium ion secondary battery 10, a known organic electrolytic solution, an inorganic solid electrolyte, and a polymer solid electrolyte which are used in a lithium ion secondary battery can be used.

As the electrolytic solution, it is preferable to use an organic electrolytic solution from the viewpoint of the electrical conductivity.

Examples of the organic electrolytic solution include an ether such as dibutyl ether, ethylene glycol monomethyl ether, ethylene glycol monoethyl ether, ethylene glycol monobutyl ether, diethylene glycol monomethyl ether, or ethylene glycol phenyl ether, an amide such as N-methylformamide, N,N-dimethylformamide, N-ethylformamide, N,N-di ethylformamide, N-methylacetamide, N,N-dimethylacetamide, N-ethylacetamide, or N,N-diethylacetamide, a sulfur-containing compound such as dimethyl sulfoxide or sulfolane, dialkyl ketone such as methyl ethyl ketone or methyl isobutyl ketone, a cyclic ether such as tetrahydrofuran or 2-methoxy tetrahydrofuran, a cyclic carbonate such as ethylene carbonate, butylene carbonate, propylene carbonate, or vinylene carbonate, a chain-like carbonate such as diethyl carbonate, dimethyl carbonate, methyl ethyl carbonate, or methyl propyl carbonate, cyclic carbonic acid ester such as γ-butyrolactone or γ-valerolactone, chain-like carbonic acid ester such as methyl acetate, ethyl acetate, methyl propionate, or ethyl propionate, and an organic solvent such as N-methyl-2-pyrrolidinone, acetonitrile, or nitromethane. These organic electrolytic solutions can be used alone or in the form of a mixture of two or more kinds thereof.

As the electrolyte, various known lithium salts can be used.

Examples of the lithium salts include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $LiN(CF_3SO_2)_2$, and $LiN(C_2F_5SO_2)_2$.

Examples of the polymer solid electrolyte include a polyethylene oxide derivative and a polymer containing the derivative, a polypropylene oxide derivative and a polymer containing the derivative, a phosphoric acid ester polymer, and a polycarbonate derivative and a polymer containing the derivative.

Since the lithium ion secondary battery 10 of the present embodiment includes the negative electrode 11 containing the synthetic graphite material of the present embodiment, capacity degradation is unlikely to occur even in a case where the charge and discharge cycles are repeated at a low temperature of 0° C. or lower. Therefore, the lithium ion secondary battery 10 of the present embodiment can be preferably used for industrial purposes such as applications for automobiles such as hybrid automobiles, plug-in hybrid automobiles, and electric automobiles and power storage of system infrastructures.

Further, the lithium ion secondary battery of the present embodiment is not limited as long as the battery is used the negative electrode of the present embodiment, and is not restricted in selecting members necessary for the configuration of the battery other than the negative electrode.

Specifically, the structure of the lithium ion secondary battery of the present embodiment is not limited to the lithium ion secondary battery 10 shown in FIG. 1.

The lithium ion secondary battery may have, for example, a structure obtained by inserting a wound electrode group in which a positive electrode and a negative electrode, which are molded into a strip shape, are spirally wound through a separator, into a battery case and sealing the case. Further, the lithium ion secondary battery may be a structure obtained by enclosing a laminated electrode plate group in which a positive electrode and a negative electrode, which are molded into a flat plate shape, are sequentially laminated through a separator, in an exterior body.

The lithium ion secondary battery of the present embodiment can be used as, for example, a paper cell, a button cell, a coin cell, a laminated cell, a cylindrical cell, or a square cell, etc.

EXAMPLES

Hereinafter, the present invention will be described in more detail with reference to examples and comparative examples. Further, the present invention is not limited to the following examples.

<Production of Synthetic Graphite Material>

Example 1

Desulfurized vacuum gas oil (sulfur content of 500 mass ppm, density of 0.88 g/cm$^3$ at 15° C.) was subjected to fluid catalytic cracking, thereby obtaining fluid catalytic cracking residual oil (hereinafter, referred to as "fluid catalytic cracking residual oil (A)"). The initial boiling point of the obtained fluid catalytic cracking residual oil (A) was 200° C., the sulfur content was 0.2% by mass, the nitrogen content was 0.1% by mass, and the content of the aroma component was 65% by mass.

Next, desulfurized vacuum gas oil (sulfur content of 500 mass ppm, density of 0.88 g/cm$^3$ at 15° C.) was subjected to fluid catalytic cracking, thereby obtaining light cycle oil (hereinafter, referred to as "fluid catalytic cracking gas oil (A)"). The initial boiling point of the obtained fluid catalytic cracking gas oil (A) was 180° C., the final boiling point thereof was 350° C., the content of the asphaltene component was 0% by mass, the saturated content was 47% by volume, and the content of the aroma component was 53% by volume.

Further, atmospheric residual oil having a sulfur content of 3.5% by mass was hydrodesulfurized in the presence of a Ni—Mo catalyst such that the hydrocracking rate reached 30% or less, thereby obtaining hydrodesulfurized oil (hereinafter, also referred to as "hydrodesulfurized oil (A)"). Raw material oil obtained by mixing desulfurized vacuum gas oil (sulfur content of 500 mass ppm, density of 0.88 g/cm$^3$ at 15° C.) with hydrodesulfurized oil (A) (sulfur content of 0.3% by mass, nitrogen content of 0.1% by mass, asphaltene component content of 2% by mass, saturated content of 70% by mass, density of 0.92 g/cm$^3$ at 15° C.) at a mass ratio of 1:2 was subjected to fluid catalytic cracking, thereby obtaining fluid catalytic cracking residual oil (hereinafter, referred to as "fluid catalytic cracking residual oil (B)"). The initial boiling point of the obtained fluid catalytic cracking residual oil (B) was 220° C., the sulfur content was 0.5% by mass, the nitrogen content was 0.1% by mass, and the aroma component was 79% by mass.

The fluid catalytic cracking residual oil (A) and the fluid catalytic cracking residual oil (B), which were heavy oils obtained in the above-described manner, and the fluid catalytic cracking gas oil (A) which was gas oil were mixed at a mass ratio of 50:40:10, thereby obtaining a raw material oil composition of Example 1. The content of the gas oil in the raw material oil composition of Example 1 is listed in Table 1.

Next, the raw material oil composition of Example 1 was put into a test tube and was subjected to a heat treatment at 500° C. for 3 hours under normal pressure as a coking treatment for coking, thereby obtaining a coking coal composition.

The obtained coking coal composition was pulverized with a hammer type mill such that the average particle diameter measured by a laser diffraction type particle size distribution measuring device reached 20.3 μm, thereby obtaining coking coal powder.

The surface area based on the volume of the coking coal powder (the surface area based on the volume of the raw material) was acquired according to the same method as that for the surface area based on the volume of the synthetic graphite material described below. The results thereof are listed in Table 1.

The obtained coking coal powder was heated (calcined) at 1000° C. in a nitrogen gas stream to obtain calcined coke. A treatment of increasing the temperature from room temperature to 1000° C. for a heating time of 4 hours, holding the temperature at 1000° C. for a holding time of 4 hours, lowering the temperature from 1000° C. to 400° C. for a cooling time of 2 hours, and allowing the powder to be naturally cooled for 4 hours while maintaining the nitrogen gas stream after the temperature reached 400° C. was performed for the calcination.

The obtained calcined coke was put into a crucible made of graphite and graphitized at 2700° C. under a nitrogen gas stream using a high-frequency induction furnace. As the graphitization treatment, a treatment of increasing the temperature from room temperature to 2700° C. for a heating time of 23 hours, holding the temperature at 2700° C. for a holding time of 3 hours, and natural cooling for 6 days, and taking out the resultant was performed.

The obtained graphite powder was pulverized with an air flow jet mill such that the average particle diameter thereof measured by a laser diffraction type particle size distribution measuring device reached 5.1 μm, thereby obtaining a synthetic graphite material of Example 1.

The size L (112) of the crystallite, the surface area based on the volume, the oil absorption, and the half width $\Delta v_G$ of the Raman spectrum of the obtained synthetic graphite material of Example 1 were acquired by the methods described below. Further, a difference between the surface area based on the volume of the raw material and the surface area based on the volume of the graphite was calculated from the measurement results of the surface area based on the volume of the raw material and the surface area based on the volume of the synthetic graphite material (the surface area based on the graphite). The results are listed in Table 1.

(Calculation of Size L (112) of Crystallite)

The synthetic graphite material was mixed with 10% by mass of a Si standard sample as an internal standard, a glass sample holder (window frame size of 16 mm×20 mm, depth of 0.2 mm) was packed with the mixture, and the measurement was performed according to a wide angle X-ray diffraction method in conformity with JIS R7651 (2007), and the size L (112) of the crystallite was calculated.

ULTIMA IV (manufactured by Rigaku Corporation) was used as the X-ray diffractometer, and CuKα rays (using Kβ filter Ni) were used as the X-ray source. Further, the voltage applied to the X-ray tube and the current thereof were set to 40 kV and 40 mA.

The obtained diffraction pattern was analyzed according to a method in conformity with JIS R7651 (2007). Specifically, the measurement data was subjected to a smoothing treatment, and then to absorption correction, polarization correction, and Lorentz correction after background removal. Thereafter, the (112) diffraction line of the synthetic graphite material was corrected using the peak position and the half width of a diffraction line (422) of the Si standard sample, and the size L (112) of the crystallite was calculated. Further, the size of the crystallite was calculated based on the half width of the corrected peak using the following Scherrer equation. The measurement and the analysis were carried out three times each, and the average value was defined as the size L (112).

$$L = K \times \lambda / (\beta \times \cos \theta B) \quad \text{Scherrer equation}$$

Here, L represents the crystal size (nm).
K represents the shape factor constant (=1.0).
λ represents the wavelength of X-rays (=0.15406 nm).
θ represents the Bragg angle (corrected diffraction angle).
β represents the true half width (correction value).

(Measurement of Surface Area Based on Volume)

The particle size distribution of the synthetic graphite material was measured using a laser diffraction/scattering type particle diameter distribution measuring device (MT3300EXII) (manufactured by Microtrac Bell Co., Ltd). The dispersion liquid used for the measurement was prepared by adding a 0.1 mass % sodium hexametaphosphate aqueous solution (several drops) and a surfactant (several drops) to approximately 0.5 g of the synthetic graphite material, sufficiently stirring the solution using a mortar so as to be homogeneous, further adding 40 mL of a 0.1 mass % sodium hexametaphosphate aqueous solution thereto, and dispersing the solution using an ultrasonic homogenizer. The surface area was calculated based on the obtained measurement results of the particle size distribution in conformity with "5.5 Calculation of surface area based on volume" in "Representation of results of particle size analysis—Part 2: Calculation of average particle sizes/diameters of moments from particle size distributions" of JIS Z 8819-2 (2001).

(Measurement of Oil Absorption)

The oil absorption was measured and calculated in conformity with "Oil absorption—Section 1: Refined linseed oil method" of JIS K 5101-13-1 (2004). Specifically, the finely weighed synthetic graphite material was placed on a measuring plate, refined linseed oil was added dropwise thereto from a burette having a volume of 10 mL, the refined linseed oil was kneaded with a palette knife so as to be completely kneaded, and the dropwise addition and the kneading were repeatedly performed. Next, the point where the paste had a smooth hardness was set as the end point, and the oil absorption was finally calculated based on the following equation.

$$O1 = 100 \times V / m$$

Here, O1 represents the oil absorption (mL00g).
V represents the volume (mL) of the refined linseed oil which had been added dropwise.
m represents the mass (g) of the synthetic graphite material placed on the measuring plate.

(Measurement of Half Width $\Delta v_G$ of Raman Spectrum)

Raman spectroscopy was performed using an $Ar^+$ laser (excitation wavelength of 514.5 nm) as the light source. The measurement was performed in a macro mode, the spot diameter of the laser was approximately 100 μm, and was set to obtain average information from the entire laser irradiation range. As the measuring device, Ramanor T-64000 (Jobin Yvon/Atago Bussan Co., Ltd.) was used. The measurement disposition was set to 60° and the laser power was set to 10 mW. In the obtained Raman spectrum diagram, the half width $\Delta v_G$ of the peak present in a wavelength range of 1580 $cm^{-1} \pm 100$ $cm^{-1}$ was calculated. The measurement and analysis were respectively performed three times, and the average value thereof was calculated as $\Delta v_G$.

Example 2

Cracking gas oil (sulfur content of 0.2% by mass, density of 0.92 $g/cm^3$ at 15° C., saturated content of 36% by volume, aroma component content of 64% by volume, asphaltene component content of 0% by mass, initial boiling point of 220° C., final boiling point of 340° C. (hereinafter, referred to as "coker cracking gas oil (A)") which was gas oil obtained by the delayed coking process was mixed with the fluid catalytic cracking residual oil (A) and the fluid catalytic cracking residual oil (B), which were heavy oils, at a mass ratio of 30:50:20, thereby obtaining a raw material oil composition of Example 2. The content of gas oil in the raw material oil composition of Example 2 is listed in Table 1.

The raw material oil composition of Example 2 was subjected to a coking treatment for coking in the same manner as in Example 1, thereby obtaining a coking coal composition.

The obtained coking coal composition was pulverized with a hammer type mill such that the average particle diameter measured by a laser diffraction type particle size distribution measuring device reached 18.2 thereby obtaining coking coal powder.

The surface area based on the volume of the coking coal powder (the surface area based on the volume of the raw material) was acquired in the same manner as in Example 1. The results thereof are listed in Table 1.

The obtained coking coal powder was calcined in the same manner as in Example 1 to obtain calcined coke.

The obtained calcined coke was put into a crucible made of graphite and graphitized at 2800° C. under a nitrogen gas stream using a high-frequency induction furnace. As the graphitization treatment, a treatment of increasing the temperature from room temperature to 2800° C. for a heating time of 23 hours, holding the temperature at 2800° C. for a holding time of 3 hours, and natural cooling for 6 days, and taking out the resultant was performed.

The obtained graphite powder was pulverized with an air flow jet mill such that the average particle diameter thereof measured by a laser diffraction type particle size distribution measuring device reached 9.8 μm, thereby obtaining a synthetic graphite material of Example 2.

The size L (112) of the crystallite, the surface area based on the volume, the oil absorption, the half width $\Delta v_G$ of the Raman spectrum, and the difference between the surface area based on the volume of the raw material and the surface area based on the volume of the graphite of the obtained synthetic graphite material of Example 2 were acquired according to the same methods as in Example 1. The results thereof are listed in Table 1.

Example 3

Desulfurized gas oil (density of 0.90 $g/cm^3$ at 15° C., aroma component content of 25% by volume, asphaltene component content of 0% by mass, initial boiling point of 180° C., final boiling point of 350° C. (hereinafter, referred to as "desulfurized gas oil (A)")) which was gas oil obtained by a gas oil desulfurization device was mixed with the fluid catalytic cracking residual oil (A) and the fluid catalytic cracking residual oil (B), which were heavy oils, at a mass ratio of 15:40:45, thereby obtaining a raw material oil composition of Example 3. The content of gas oil in the raw material oil composition of Example 3 is listed in Table 1.

The raw material oil composition of Example 3 was subjected to a coking treatment for coking in the same manner as in Example 1, thereby obtaining a coking coal composition.

The obtained coking coal composition was pulverized with a hammer type mill such that the average particle diameter measured by a laser diffraction type particle size distribution measuring device reached 19.6 μm, thereby obtaining coking coal powder.

The surface area based on the volume of the coking coal powder (the surface area based on the volume of the raw material) was acquired in the same manner as in Example 1. The results thereof are listed in Table 1.

The obtained coking coal powder was calcined in the same manner as in Example 1 to obtain calcined coke.

The obtained calcined coke was put into a crucible made of graphite and graphitized at 2900° C. under a nitrogen gas stream using a high-frequency induction furnace. As the graphitization treatment, a treatment of increasing the temperature from room temperature to 2800° C. for a heating time of 23 hours, holding the temperature at 2900° C. for a holding time of 3 hours, and natural cooling for 6 days, and taking out the resultant was performed.

The obtained graphite powder was pulverized with an air flow jet mill such that the average particle diameter thereof measured by a laser diffraction type particle size distribution measuring device reached 12.1 μm, thereby obtaining a synthetic graphite material of Example 3.

The size L (112) of the crystallite, the surface area based on the volume, the oil absorption, the half width $\Delta v_G$ of the Raman spectrum, and the difference between the surface area based on the volume of the raw material and the surface area based on the volume of the graphite of the obtained synthetic graphite material of Example 3 were acquired according to the same methods as in Example 1. The results thereof are listed in Table 1.

Example 4

The fluid catalytic cracking residual oil (A) and the fluid catalytic cracking residual oil (B) which were heavy oils were mixed with the coker cracking gas oil (A) which was gas oil at a mass ratio of 75:20:5, thereby obtaining a raw material oil composition of Example 4. The content of gas oil in the raw material oil composition of Example 4 is listed in Table 1.

The raw material oil composition of Example 4 was subjected to a coking treatment for coking in the same manner as in Example 1, thereby obtaining a coking coal composition.

The obtained coking coal composition was pulverized with a hammer type mill such that the average particle diameter measured by a laser diffraction type particle size distribution measuring device reached 39.3 μm, thereby obtaining coking coal powder.

The surface area based on the volume of the coking coal powder (the surface area based on the volume of the raw material) was acquired in the same manner as in Example 1. The results thereof are listed in Table 1.

The obtained coking coal powder was put into a crucible made of graphite, embedded in an Acheson furnace with coke breeze, and graphitized at 3050° C. As the graphitization treatment, a treatment of increasing the temperature from room temperature to 3050° C. for a heating time of 130 hours, holding the temperature at 3050° C. for a holding time of 8 hours, and natural cooling for 25 days, and taking out the resultant was performed.

The obtained graphite powder was pulverized with an air flow jet mill such that the average particle diameter thereof measured by a laser diffraction type particle size distribution measuring device reached 9.8 μm, thereby obtaining a synthetic graphite material of Example 4.

The size L (112) of the crystallite, the surface area based on the volume, the oil absorption, the half width $\Delta v_G$ of the Raman spectrum, and the difference between the surface area based on the volume of the raw material and the surface area based on the volume of the graphite of the obtained synthetic graphite material of Example 4 were acquired according to the same methods as in Example 1. The results thereof are listed in Table 1.

Example 5

The fluid catalytic cracking residual oil (A) which was heavy oil was mixed with the coker cracking gas oil (A) which was gas oil at a mass ratio of 75:25, thereby obtaining a raw material oil composition of Example 5. The content of gas oil in the raw material oil composition of Example 5 is listed in Table 1.

The raw material oil composition of Example 5 was subjected to a coking treatment for coking in the same manner as in Example 1, thereby obtaining a coking coal composition.

The obtained coking coal composition was pulverized with a hammer type mill such that the average particle diameter measured by a laser diffraction type particle size distribution measuring device reached 52.7 μm, thereby obtaining coking coal powder.

The surface area based on the volume of the coking coal powder (the surface area based on the volume of the raw material) was acquired in the same manner as in Example 1. The results thereof are listed in Table 1.

The obtained coking coal powder was put into a crucible made of graphite, embedded in an Acheson furnace with coke breeze, and graphitized at 3150° C. As the graphitization treatment, a treatment of increasing the temperature from room temperature to 3150° C. for a heating time of 130 hours, holding the temperature at 3150° C. for a holding time of 8 hours, and natural cooling for 25 days, and taking out the resultant was performed.

The obtained graphite powder was pulverized with an air flow jet mill such that the average particle diameter thereof measured by a laser diffraction type particle size distribution measuring device reached 29.8 thereby obtaining a synthetic graphite material of Example 5.

The size L (112) of the crystallite, the surface area based on the volume, the oil absorption, the half width $\Delta v_G$ of the Raman spectrum, and the difference between the surface area based on the volume of the raw material and the surface area based on the volume of the graphite of the obtained synthetic graphite material of Example 5 were acquired according to the same methods as in Example 1. The results thereof are listed in Table 1.

Comparative Example 1

Only the fluid catalytic cracking residual oil (A) which was heavy oil was used as a raw material oil composition of Comparative Example 1.

The fluid catalytic cracking residual oil (A) was subjected to a coking treatment for coking in the same manner as in Example 1, thereby obtaining a coking coal composition.

The obtained coking coal composition was pulverized with a hammer type mill such that the average particle diameter measured by a laser diffraction type particle size distribution measuring device reached 28.4 μm, thereby obtaining coking coal powder.

The surface area based on the volume of the coking coal powder (the surface area based on the volume of the raw material) was acquired in the same manner as in Example 1. The results thereof are listed in Table 2.

The obtained coking coal powder was calcined in the same manner as in Example 1 to obtain calcined coke.

The obtained calcined coke was put into a crucible made of graphite and graphitized at 2700° C. under a nitrogen gas stream using a high-frequency induction furnace. As the graphitization treatment, a treatment of increasing the temperature from room temperature to 2700° C. for a heating time of 23 hours, holding the temperature at 2700° C. for a holding time of 3 hours, and natural cooling for 6 days, and taking out the resultant was performed.

The obtained graphite powder was pulverized with an air flow jet mill such that the average particle diameter thereof measured by a laser diffraction type particle size distribution measuring device reached 10.2 μm, thereby obtaining a synthetic graphite material of Comparative Example 1.

The size L (112) of the crystallite, the surface area based on the volume, the oil absorption, the half width $\Delta v_G$ of the Raman spectrum, and the difference between the surface area based on the volume of the raw material and the surface area based on the volume of the graphite of the obtained synthetic graphite material of Comparative Example 1 were acquired according to the same methods as in Example 1. The results thereof are listed in Table 2.

Comparative Example 2

The coker cracking gas oil (A) which was gas oil was mixed with the fluid catalytic cracking residual oil (A) and the fluid catalytic cracking residual oil (B), which were heavy oils, at a mass ratio of 35:30:35, thereby obtaining a raw material oil composition of Comparative Example 2. The content of gas oil in the raw material oil composition of Comparative Example 2 is listed in Table 2.

The raw material oil composition of Comparative Example 2 was subjected to a coking treatment for coking in the same manner as in Example 1, thereby obtaining a coking coal composition.

The obtained coking coal composition was pulverized with a hammer type mill such that the average particle diameter measured by a laser diffraction type particle size distribution measuring device reached 14.3 μm, thereby obtaining coking coal powder. The surface area based on the volume of the coking coal powder (the surface area based on the volume of the raw material) was acquired in the same manner as in Example 1. The results thereof are listed in Table 2.

The obtained coking coal powder was calcined in the same manner as in Example 1 to obtain calcined coke.

The obtained calcined coke was put into a crucible made of graphite and graphitized at 2800° C. under a nitrogen gas stream using a high-frequency induction furnace. As the graphitization treatment, a treatment of increasing the temperature from room temperature to 2800° C. for a heating time of 23 hours, holding the temperature at 2800° C. for a holding time of 3 hours, and natural cooling for 6 days, and taking out the resultant was performed.

The obtained graphite powder was pulverized with an air flow jet mill such that the average particle diameter thereof measured by a laser diffraction type particle size distribution measuring device reached 9.4 μm, thereby obtaining a synthetic graphite material of Comparative Example 2.

The size L (112) of the crystallite, the surface area based on the volume, the oil absorption, the half width $\Delta v_G$ of the Raman spectrum, and the difference between the surface area based on the volume of the raw material and the surface area based on the volume of the graphite of the obtained synthetic graphite material of Comparative Example 2 were acquired according to the same methods as in Example 1. The results thereof are listed in Table 2.

Comparative Example 3

The desulfurized gas oil (A) which was gas oil was mixed with the fluid catalytic cracking residual oil (A) and the fluid catalytic cracking residual oil (B), which were heavy oils, at a mass ratio of 45:20:35, thereby obtaining a raw material oil composition of Comparative Example 3. The content of gas oil in the raw material oil composition of Comparative Example 3 is listed in Table 2.

The raw material oil composition of Comparative Example 3 was subjected to a coking treatment for coking in the same manner as in Example 1, thereby obtaining a coking coal composition.

The obtained coking coal composition was pulverized with a hammer type mill such that the average particle diameter measured by a laser diffraction type particle size distribution measuring device reached 25.7 thereby obtaining coking coal powder.

The surface area based on the volume of the coking coal powder (the surface area based on the volume of the raw material) was acquired in the same manner as in Example 1. The results thereof are listed in Table 2.

The obtained coking coal powder was calcined in the same manner as in Example 1 to obtain calcined coke.

The obtained calcined coke was put into a crucible made of graphite and graphitized at 2900° C. under a nitrogen gas stream using a high-frequency induction furnace. As the graphitization treatment, a treatment of increasing the temperature from room temperature to 2900° C. for a heating time of 23 hours, holding the temperature at 2900° C. for a holding time of 3 hours, and natural cooling for 6 days, and taking out the resultant was performed.

The obtained graphite powder was pulverized with an air flow jet mill such that the average particle diameter thereof measured by a laser diffraction type particle size distribution measuring device reached 19.8 thereby obtaining a synthetic graphite material of Comparative Example 3.

The size L (112) of the crystallite, the surface area based on the volume, the oil absorption, the half width $\Delta v_G$ of the Raman spectrum, and the difference between the surface area based on the volume of the raw material and the surface area based on the volume of the graphite of the obtained synthetic graphite material of Comparative Example 3 were acquired according to the same methods as in Example 1. The results thereof are listed in Table 2.

Comparative Example 4

The fluid catalytic cracking residual oil (A) which was heavy oil was mixed with the coker cracking gas oil (A), which was gas oil, at a mass ratio of 50:50, thereby obtaining a raw material oil composition of Comparative Example 4. The content of gas oil in the raw material oil composition of Comparative Example 4 is listed in Table 2.

The raw material oil composition of Comparative Example 4 was subjected to a coking treatment for coking in the same manner as in Example 1, thereby obtaining a coking coal composition.

The obtained coking coal composition was pulverized with a hammer type mill such that the average particle diameter measured by a laser diffraction type particle size distribution measuring device reached 58.6 μm, thereby obtaining coking coal powder.

The surface area based on the volume of the coking coal powder (the surface area based on the volume of the raw material) was acquired in the same manner as in Example 1. The results thereof are listed in Table 2.

The obtained coking coal powder was put into a crucible made of graphite, embedded in an Acheson furnace with coke breeze, and graphitized at 3150° C. As the graphitization treatment, a treatment of increasing the temperature from room temperature to 3150° C. for a heating time of 130 hours, holding the temperature at 3150° C. for a holding time of 8 hours, and natural cooling for 25 days, and taking out the resultant was performed.

The obtained graphite powder was pulverized with an air flow jet mill such that the average particle diameter thereof measured by a laser diffraction type particle size distribution measuring device reached 24.5 μm, thereby obtaining a synthetic graphite material of Comparative Example 4.

The size L (112) of the crystallite, the surface area based on the volume, the oil absorption, the half width $\Delta v_G$ of the Raman spectrum, and the difference between the surface area based on the volume of the raw material and the surface area based on the volume of the graphite of the obtained synthetic graphite material of Comparative Example 4 were acquired according to the same methods as in Example 1. The results thereof are listed in Table 2.

Comparative Example 5

Only the fluid catalytic cracking residual oil (B) which was heavy oil was used as a raw material oil composition of Comparative Example 5.

The fluid catalytic cracking residual oil (B) was subjected to a coking treatment for coking in the same manner as in Example 1, thereby obtaining a coking coal composition.

The obtained coking coal composition was pulverized with a hammer type mill such that the average particle diameter measured by a laser diffraction type particle size distribution measuring device reached 48.4 μm, thereby obtaining coking coal powder.

The surface area based on the volume of the coking coal powder (the surface area based on the volume of the raw material) was acquired in the same manner as in Example 1. The results thereof are listed in Table 2.

The obtained coking coal powder was put into a crucible made of graphite, embedded in an Acheson furnace with coke breeze, and graphitized at 3050° C. As the graphitization treatment, a treatment of increasing the temperature from room temperature to 3050° C. for a heating time of 130 hours, holding the temperature at 3050° C. for a holding time of 8 hours, and natural cooling for 25 days, and taking out the resultant was performed.

The obtained graphite powder was pulverized with an air flow jet mill such that the average particle diameter thereof measured by a laser diffraction type particle size distribution measuring device reached 20.7 thereby obtaining a synthetic graphite material of Comparative Example 5.

The size L (112) of the crystallite, the surface area based on the volume, the oil absorption, the half width $\Delta v_G$ of the Raman spectrum, and the difference between the surface area based on the volume of the raw material and the surface area based on the volume of the graphite of the obtained synthetic graphite material of Comparative Example 5 were acquired according to the same methods as in Example 1. The results thereof are listed in Table 2.

Example 6

The synthetic graphite material obtained in Example 3 was mixed with the synthetic graphite material obtained in Comparative Example 2 at a mass ratio of 50:50, thereby obtaining a synthetic graphite material of Example 6 which was formed of the mixture.

Example 7

The synthetic graphite material obtained in Example 3 was mixed with the synthetic graphite material obtained in Comparative Example 2 at a mass ratio of 30:70, thereby obtaining a synthetic graphite material of Example 7 which was formed of the mixture.

Example 8

The synthetic graphite material obtained in Example 3 was mixed with the synthetic graphite material obtained in Comparative Example 2 at a mass ratio of 20:80, thereby obtaining a synthetic graphite material of Example 8 which was formed of the mixture.

<Preparation of Battery for Evaluation>

The lithium ion secondary battery 10 shown in FIG. 1 was prepared as a battery for evaluation according to the method described below. As the negative electrode 11, the negative electrode current collector 12, the positive electrode 13, the positive electrode current collector 14, and the separator 15, those described below were used.

(Negative Electrode 11 and Negative Electrode Current Collector 12)

Any of the synthetic graphite materials obtained in Examples 1 to 8 and Comparative Example 1 to 5, a carboxymethyl cellulose (CMC (BSH-6, manufactured by DKS Co., Ltd.)) aqueous solution as a binding agent adjusted to have a concentration of 1.5% by mass, and an aqueous solution in which styrene-butadiene rubber (SBR) as a binding agent was dispersed at a concentration of 48% by mass were mixed at a solid content mass ratio of 98:1:1, thereby obtaining a paste-like negative electrode mixture. The entire one surface of copper foil having a thickness of 18 μm serving as the negative electrode current collector 12 was coated with the obtained negative electrode mixture, dried, and rolled to obtain a negative electrode sheet in which the negative electrode 11 which was a layer formed of the negative electrode mixture was formed on the negative electrode current collector 12. The amount of the negative electrode mixture applied onto the negative electrode sheet per unit area was adjusted such that the mass of the graphite material reached approximately 10 mg/cm$^2$.

Thereafter, the negative electrode sheet was cut into a width of 32 mm and a length of 52 mm. Further, a part of the negative electrode 11 was scraped off in a direction perpendicular to the longitudinal direction of the sheet to expose the negative electrode current collector 12 functioning as a negative electrode lead plate.

(Positive Electrode 13 and Positive Electrode Current Collector 14)

Lithium cobaltate $LiCoO_2$ (CELLSEED C10N, manufactured by Nippon Chemical Industrial Co., Ltd.) having an average particle diameter of 10 μm as a positive electrode material, polyvinylidene fluoride (KF #1120, manufactured by Kureha Corporation) as a binding agent, and acetylene black (DENKA BLACK, manufactured by Denka Co., Ltd.) as a conductive assistant were mixed at a mass ratio of 89:6:5, and N-methyl-2-pyrrolidinone was added thereto as a solvent so that the mixture was kneaded, thereby obtaining a paste-like positive electrode mixture. The entire one surface of aluminum foil having a thickness of 30 μm serving as the positive electrode current collector 14 was coated with the obtained positive electrode mixture, dried, and rolled to obtain a positive electrode sheet in which the positive electrode 13 which was a layer formed of the positive electrode mixture was formed on the positive electrode current collector 14. The amount of the positive electrode mixture applied onto the positive electrode sheet per unit area was adjusted such that the mass of the lithium cobaltate reached approximately 20 mg/cm$^2$.

Thereafter, the positive electrode sheet was cut into a width of 30 mm and a length of 50 mm. Further, a part of the positive electrode 13 was scraped off in a direction perpendicular to the longitudinal direction of the sheet to expose the positive electrode current collector 14 functioning as a positive electrode lead plate.

(Separator 15)

As the separator 15, cellulose-based non-woven fabric (TF40-50, manufactured by Nippon Kodoshi Corporation) was used.

First, the negative electrode sheet in which the negative electrode 11, the negative electrode current collector 12, and the negative electrode lead plate were integrated with each other, the positive electrode sheet in which the positive electrode 13, the positive electrode current collector 14, and the positive electrode lead plate were integrated with each other, the separator 15, and other members used for the lithium ion secondary battery 10 were dried in order to prepare the lithium ion secondary battery 10 shown in FIG. 1. Specifically, the negative electrode sheet and the positive electrode sheet were dried at 120° C. under reduced pressure for 12 hours or longer. Further, the separator 15 and other members were dried at 70° C. under reduced pressure for 12 hours or longer.

Next, the negative electrode sheet, the positive electrode sheet, the separator 15, and other members which had been dried were assembled in an argon gas circulation type glove box at which the dew point was controlled to −60° C. or lower. In this manner, as shown in FIG. 1, the positive electrode 13 and the negative electrode 11 were laminated so as to face each other through the separator 15 to obtain a single-layer electrode body fixed with polyimide tape (not shown). Further, the negative electrode sheet and the positive electrode sheet were laminated such that the peripheral edge portion of the laminated positive electrode sheet was disposed to be surrounded by the inside of the peripheral edge portion of the negative electrode sheet.

Next, the single-layer electrode body was accommodated in the aluminum laminate exterior 16, and an electrolytic solution was injected thereinto. An electrolytic solution obtained by dissolving lithium hexafluorophosphate ($LiPF_6$) as an electrolyte in a solvent at a concentration of 1 mol/L and further mixing vinylene carbonate (VC) with the solution at a concentration of 1.5 wt % was used as the electrolytic solution. A solvent obtained by mixing ethylene carbonate (EC), dimethyl carbonate (DMC), and ethyl methyl carbonate (EMC) at a volume ratio of 3:4:3 was used as the solvent.

Thereafter, the aluminum laminate exterior 16 was heat-fused in a state where the positive electrode lead plate and the negative electrode lead plate protruded.

By performing the above-described steps, the sealed lithium ion secondary batteries 10 of Examples 1 to 8 and Comparative Examples 1 to 5 were obtained.

<Charge and Discharge Test of Battery for Evaluation>

A charge and discharge test described below was performed on each of the lithium ion secondary batteries 10 of Examples 1 to 8 and Comparative Examples 1 to 5.

First, a preliminary test for detecting abnormalities in the batteries was performed. That is, each battery was placed in a thermostatic chamber at 25° C., charged with a constant current of 4 mA until the battery voltage reached 4.2 V, paused for 10 minutes, and discharged with the same constant current until the battery voltage reached 3.0 V. These charge, pause, and discharge were defined as one charge and discharge cycle, and the preliminary test was performed by repeating the charge and discharge cycle three times under the same conditions.

By performing this preliminary test, it was confirmed that all the batteries of Examples 1 to 8 and Comparative Examples 1 to 5 did not have abnormalities. Thereafter, the following main test was performed. In addition, the preliminary test is not included in the number of cycles of the main test.

In the main test, each battery was placed in a thermostatic chamber at 25° C., charged with a constant current at a constant voltage by setting the charging current to 30 mA, the charging voltage to 4.2 V, and the charging time to 3 hours, paused for 10 minutes, and discharged with the same charging current (30 mA) until the battery voltage reached 3.0 V. These charge, pause, and discharge were defined as one charge and discharge cycle, and the discharge capacity in the third cycle was defined as the "initial discharge capacity" by repeating the charge and discharge cycle three times under the same conditions.

Next, the battery was placed in a thermostatic chamber at a set temperature of 0° C. and allowed to stand still for 5 hours, and the charge and discharge cycle was repeated 100 times under the same conditions as those for the charge and discharge cycle from which the initial discharge capacity was acquired. Thereafter, the battery was placed in a thermostatic chamber at 25° C. again and allowed to stand still for 5 hours, the charge and discharge cycle was repeated three times under the same conditions as those for the charge and discharge cycle from which the initial discharge capacity was acquired, and the discharge capacity in the third cycle was defined as the "discharge capacity after charging and discharging of the battery were repeated at a temperature of 0° C.".

As an index showing the capacity degradation after charging and discharging of the battery were repeated at a temperature of 0° C., the retention rate (%) of the "discharge capacity after repetition of charging and discharging of the battery at a temperature of 0° C." with respect to the "initial discharge capacity" described above was calculated based on the following (Mathematical Formula 1).

The results thereof are listed in Tables 1 and 2.

(Equation 1)

$$\begin{pmatrix} \text{Retention rate of} \\ \text{discharge capacity} \\ \text{after repetition of} \\ \text{charging and} \\ \text{dicharging of} \\ \text{battery at } 0°\text{ C.} \end{pmatrix} = \frac{\begin{pmatrix} \text{Initial} \\ \text{capacity} \end{pmatrix}}{\begin{pmatrix} \text{Discharge capacity} \\ \text{after repetition of} \\ \text{charging and} \\ \text{dicharging of} \\ \text{battery at } 0°\text{ C.} \end{pmatrix}} \times 100$$

TABLE 1

| Example | Raw material oil composition | Content of gas oil (% by mass) | Coking coal powder Surface area based on volume of raw material (m²/cm³) | L (112) (nm) | Surface area based on volume (m²/cm³) | Difference between surface area based on volume of raw material and surface area based on volume of graphite (m²/cm³) | Oil absorption (mL/100 g) | Half width $\Delta\nu_G$ of Raman spectrum (cm-1) | Battery characteristics Discharge capacity retention rate after repetition of charging and discharging of battery at 0° C. |
|---|---|---|---|---|---|---|---|---|---|
| Example 1 | Fluid catalytic cracking residual oil (A):fluid catalytic cracking residual oil (B):fluid catalytic cracking residual oil (A) = 50:40:10 | 10 | 0.346 | 4 | 1.700 | 1.354 | 72 | 23 | 91.1 |
| Example 2 | Fluid catalytic cracking residual oil (A):fluid catalytic cracking residual oil (B):coker cracking gas oil (A) = 50:20:30 | 30 | 0.386 | 7 | 0.809 | 0.423 | 67 | 19 | 92.4 |
| Example 3 | Fluid catalytic cracking residual oil (A):fluid catalytic cracking residual oil (B):desulfurized gas oil (A) = 40:45:15 | 15 | 0.358 | 14 | 0.633 | 0.275 | 98 | 22 | 96.3 |
| Example 4 | Fluid catalytic cracking residual oil (A):fluid catalytic cracking residual oil (B):coker cracking gas oil (A) = 75:25:5 | 5 | 0.178 | 23 | 0.371 | 0.193 | 147 | 24 | 93.5 |
| Example 5 | Fluid catalytic cracking residual oil (A):coker cracking gas oil (A) = 75:25 | 25 | 0.133 | 30 | 0.220 | 0.087 | 136 | 20 | 94.2 |

TABLE 2

| Example | Raw material oil composition | Content of gas oil (% by mass) | Coking coal powder Surface area based on volume of raw material (m²/cm³) | L (112) (nm) | Surface area based on volume (m²/cm³) | Difference between surface area based on volume of raw material and surface area based on volume of graphite (m²/cm³) | Oil absorption (mL/100 g) | Half width $\Delta\nu_G$ of Raman spectrum (cm-1) | Battery characteristics Discharge capacity retention rate after repetition of charging and discharging of battery at 0° C. |
|---|---|---|---|---|---|---|---|---|---|
| Comparative Example 1 | Fluid catalytic cracking residual oil (A) | 0 | 0.247 | 4 | 0.772 | 0.525 | 61 | 25 | 74.6 |
| Comparative Example 2 | Fluid catalytic cracking residual oil (A):fluid | 35 | 0.492 | 6 | 0.849 | 0.357 | 55 | 20 | 78.5 |

TABLE 2-continued

| | | Synthetic graphite material | | | | | | Battery characteristics |
|---|---|---|---|---|---|---|---|---|
| Example | Raw material oil composition | Content of gas oil (% by mass) | Coking coal powder Surface area based on volume of raw material ($m^2/cm^3$) | L (112) (nm) | Surface area based on volume ($m^2/cm^3$) | Difference between surface area based on volume of raw material and surface area based on volume of graphite ($m^2/cm^3$) | Oil absorption (mL/100 g) | Half width $\Delta v_G$ of Raman spectrum (cm-1) | Discharge capacity retention rate after repetition of charging and discharging of battery at 0° C. |
| | catalytic cracking residual oil (B):coker cracking gas oil (A) = 30:35:35 | | | | | | | | |
| Comparative Example 3 | Fluid catalytic cracking residual oil (A):fluid catalytic cracking residual oil (B):desulfurized gas oil (A) = 20:35:45 | 45 | 0.273 | 11 | 0.357 | 0.084 | 76 | 17 | 84.7 |
| Comparative Example 4 | Fluid catalytic cracking residual oil (A):coker cracking gas oil (A) = 50:50 | 50 | 0.119 | 33 | 0.279 | 0.160 | 161 | 18 | 71.3 |
| Comparative Example 5 | Fluid catalytic cracking residual oil (B) | 0 | 0.144 | 28 | 0.339 | 0.195 | 155 | 26 | 65.9 |
| Example 6 | — | — | — | — | — | — | — | — | 91.0 |
| Example 7 | — | — | — | — | — | — | — | — | 90.3 |
| Example 8 | — | — | — | — | — | — | — | — | 88.7 |

As listed in Table 1, in each of the lithium ion secondary batteries of Examples 1 to 8 having a negative electrode containing the synthetic graphite material of the present invention, the "discharge capacity retention rate (%) after charging and discharging of the battery were repeated at a temperature of 0° C." was 85% or greater.

Based on this result, it was confirmed that in the lithium ion secondary battery using a negative electrode containing the synthetic graphite material of the present invention, the discharge capacity is unlikely to be degraded even in a case where the charge and discharge cycles are repeated at a temperature of 0° C. or lower.

Further, as listed in Tables 1 and 2, the discharge capacity retention rate of Example 3 was 96.3%, and the discharge capacity retention rate of Comparative Example 2 was 78.5%. Based on this result, it was confirmed that the additive property was not established in a case where a mixture of the synthetic graphite material of Example 3 and the synthetic graphite material of Comparative Example 2, which was the synthetic graphite material containing 50% by mass (Example 6) of the synthetic graphite material of Example 3, 30% by mass (Example 7) of the synthetic graphite material of Example 3, or 20% by mass (Example 8) of the synthetic graphite material of Example 3, was used. The reason for this is not clear, but there is a possibility that in the lithium ion secondary batteries of Examples 6 to 8, the lithium ions temporarily occluded in the synthetic graphite material of Example 3 were occluded in the synthetic graphite of Comparative Example 2 only by diffusion in the solid phase without the liquid phase (electrolytic solution).

Further, in the lithium ion secondary batteries of Comparative Example 2 in which the synthetic graphite material having an oil absorption that was out of the range of the present invention was used, Comparative Example 3 in which the synthetic graphite material having a half width $\Delta v_G$ that was out of the range of the present invention was used, and Comparative Examples 1, 4 and 5 in which the synthetic graphite material having an oil absorption and a half width $\Delta v_G$ that were respectively out of the range of the present invention was used, the "discharge capacity retention rates (%) after charging and discharging of the batteries were repeated at a temperature of 0° C." were less than 85%, which were lower than those of Examples 1 to 8.

INDUSTRIAL APPLICABILITY

In the lithium ion secondary battery having a negative electrode containing the synthetic graphite material according to the present invention, degradation of the discharge capacity due to repetition of charging and discharging of the battery at 0° C. is unlikely to occur. Therefore, the lithium ion secondary battery of the present invention can be preferably used for industrial purposes such as applications for automobiles such as hybrid automobiles, plug-in hybrid automobiles, and electric automobiles and power storage of system infrastructures.

REFERENCE SIGNS LIST

10: Lithium ion secondary battery
11: Negative electrode
12: Negative electrode current collector
13: Positive electrode
14: Positive electrode current collector
15: Separator
16: Aluminum laminate exterior

What is claimed is:

1. A production method of a synthetic graphite material which is split pulverized and is also peeling pulverized, comprising at least:
    a step of performing a coking treatment on a raw material oil composition having a content of gas oil in a range of 5% to 30% by mass by performing a delayed coking process at a pressure in a range of 100 to 800 kPa and a temperature in a range of 400-600° C. to generate a coking coal composition;

a step of pulverizing the coking coal composition to obtain coking coal powder;

a step of performing a heat treatment on the coking coal powder to obtain graphite powder; and a step of pulverizing the graphite powder and the synthetic graphite material, which is split pulverized and is also peeled pulverized comprises:

a size L (112) of a crystallite in a c-axis direction as calculated from a (112) diffraction line obtained by an X-ray wide angle diffraction method is in a range of 4 to 30 nm, a surface area based on a volume as calculated by a laser diffraction type particle size distribution measuring device is in a range of 0.22 to 1.70 m$^2$/cm$^3$, an oil absorption is in a range of 67 to 147 mL/100 g, and a half width $\Delta_{VG}$ of a peak present in a wavelength range of 1580 cm$^{-1}$±100 cm$^{-1}$ is in a range of 19 to 24 cm$^{-1}$ in Raman spectrum analysis using argon ion laser light having a wavelength of 514.5 nm.

2. The production method according to claim 1, wherein the raw material oil composition contains at least gas oil having a final boiling point of 380° C. or lower and less than 1% by mass of an asphaltene component and heavy oil having an initial boiling point of 200° C. or higher, 50% by mass or greater of an aroma component, 0.5% by mass or less of a sulfur content, and 0.2% by mass or less of a nitrogen content.

\* \* \* \* \*